July 6, 1965 W. H. NICOLSON ETAL 3,192,708
ROCKET MOTORS
Filed Aug. 24, 1961 2 Sheets-Sheet 1
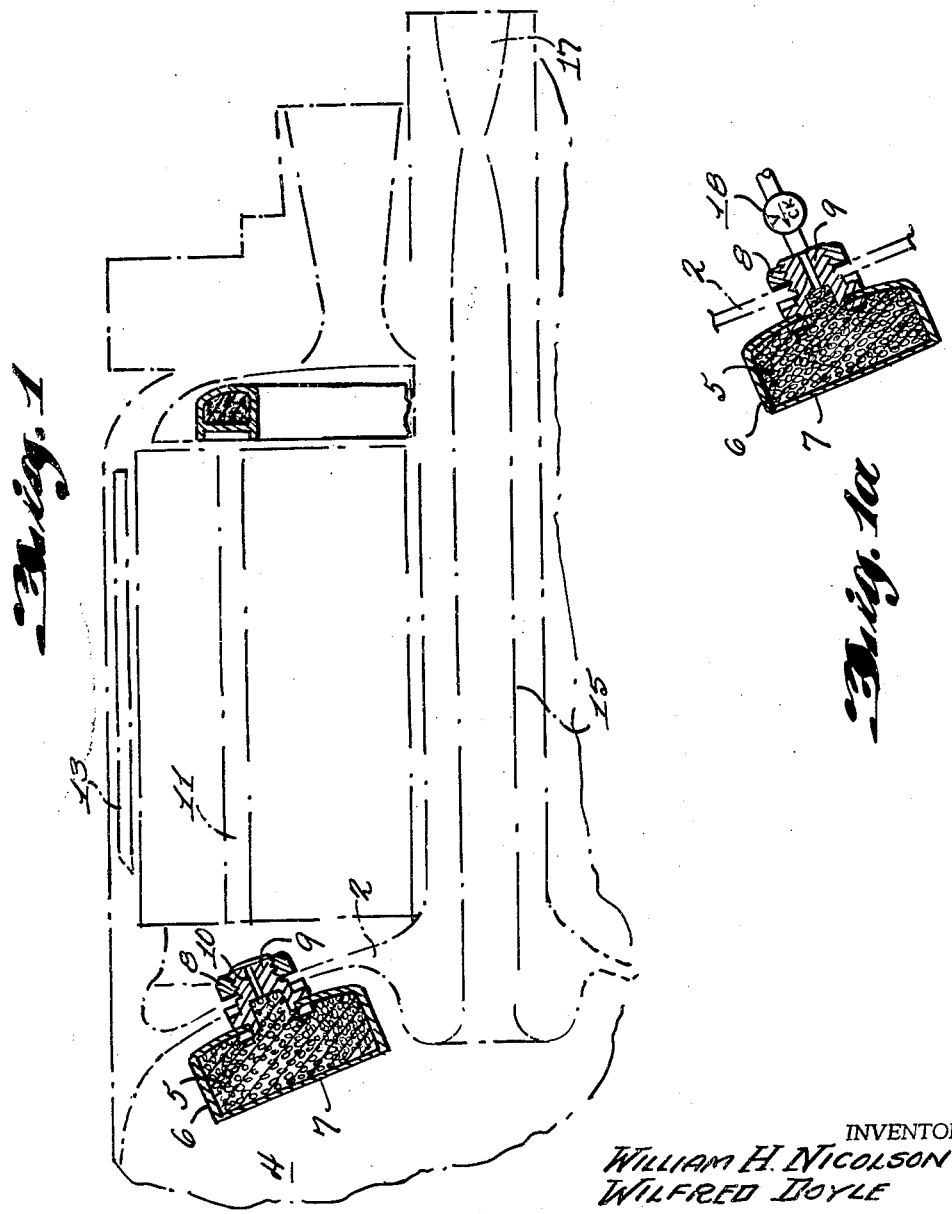
INVENTORS
WILLIAM H. NICOLSON
WILFRED BOYLE
BY
Cushman, Darby & Cushman
ATTORNEYS

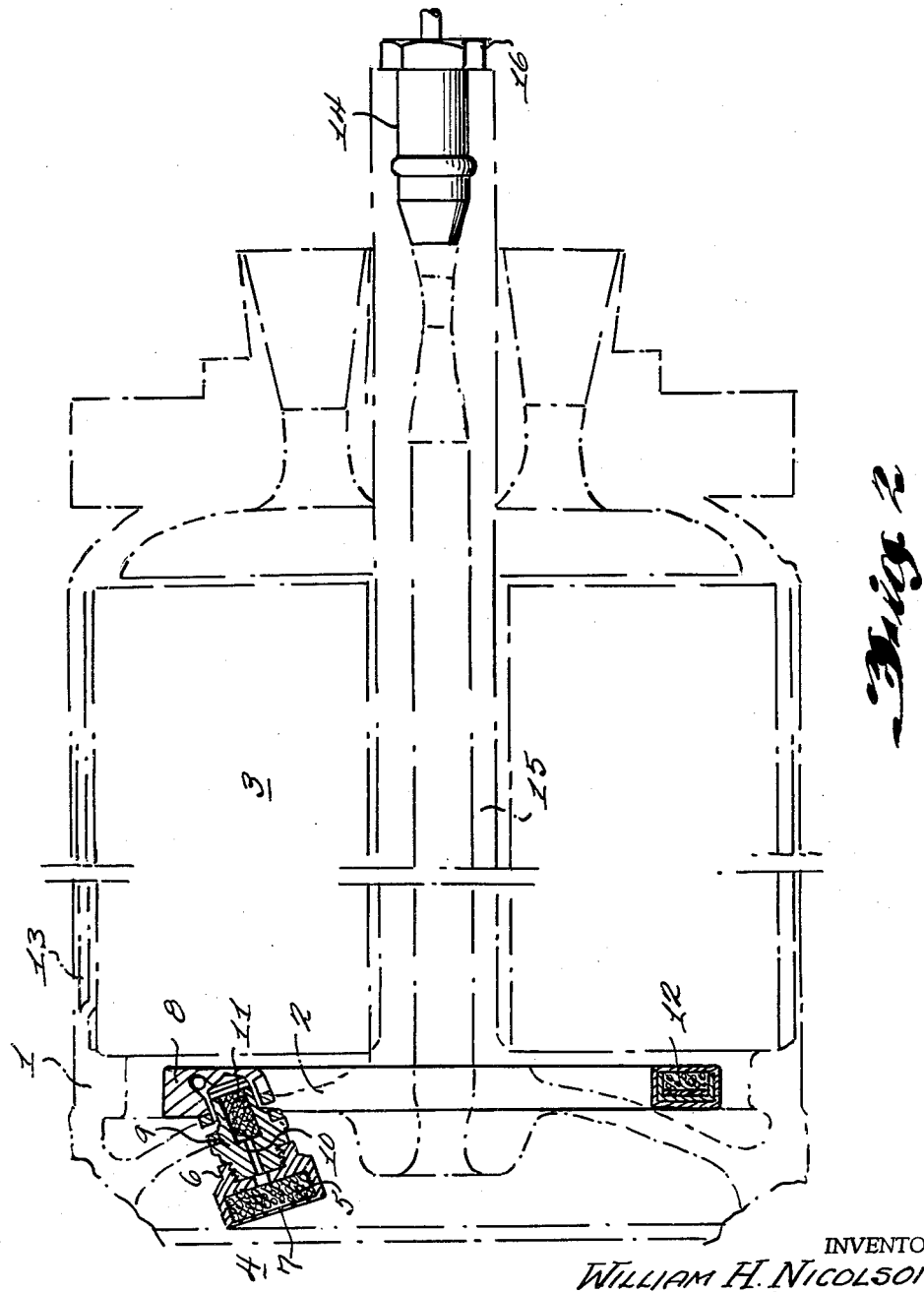

ROCKET MOTORS

William Hugh Nicolson, Kidderminster, and Wilfred Doyle, Kingswinford, England, assignors to Imperial Chemical Industries Limited, London, England, a corporation of Great Britain
Filed Aug. 24, 1961, Ser. No. 133,659
Claims priority, application Great Britain, Sept. 15, 1960, 31,883/60
10 Claims. (Cl. 60—35.6)

The present invention relates to rocket motors of the kind comprising at least two solid propellant charges which are required to be ignited substantially simultaneously, for example, a boost charge designed to accelerate the rocket to a pre-determined speed and a sustainer charge designed to maintain the rocket at or about the said speed.

For various reasons, including the fact that the ignition surface of at least one of the solid propellant charges is usually relatively inaccessible, both charges have hitherto been lit most commonly by separate electrically-fired igniters. Such a practice, however, increases the possibility of failure over what would be the case were both charges to be ignited by a single electrically-fired igniter because of the additional circuitry and components necessary.

The object of the present invention, therefore, is to provide a double chamber dual thrust solid propellant rocket motor wherein ignition of the solid propellant of the second stage is effected without using a separate electrical igniter in its ignition.

According to the present invention a rocket motor has two solid propellant charges, two igniters, and a septum or partition, wherein one igniter is for each charge, wherein one charge and its igniter are on one side and the other charge and its igniter are on the other side of the septum, wherein at least one of said igniters is adjacent to said septum, and wherein said septum has a port therethrough communicating with any igniter adjacent said septum to permit such an igniter to be ignited by heat energy resulting from the ignition of the igniter on the other side of the septum.

In accordance with one embodiment of the invention one of the igniters, i.e. that igniter to be first ignited, of the rocket motor is disposed remote from said septum, so in the main it is the heat energy developed by the charge ignited by this igniter which passes through said port to ignite the igniter adjacent the septum.

In accordance with another embodiment of the invention the septum of the rocket motor has an igniter adjacent each side thereof, so it is the heat energy developed by the igniter arranged first to be ignited and by the charge ignited by this igniter which passes through said port to ignite the igniter adjacent the other side of the septum.

By the term "adjacent" throughout the specification and claims is meant adjacent, close proximity to, or juxtaposed.

Preferably any igniter adjacent the septum comprises a charge capitively arranged in a container to prevent dispersion of the charge before proper ignition thereof.

The igniter to be first ignited may contain an electrical igniter or may be associated with an electrical igniter or with other ignition means.

Conveniently there will be a passage extending through or about the solid propellant charge which is to be ignited first, to facilitate spread of flame and insofar as the first-mentioned embodiment is concerned to enable gas from the burning charge to reach the port.

In accordance with the first-mentioned embodiment of the invention, ignition of the first solid propellant charge which will usually be the boost charge is followed by a rise in pressure in the chamber containing the boost charge and will result in a flow of propellant gas through the port. If desired the port may be sufficiently large to enable the flow of gas to assist in raising the pressure in the second chamber, which will usually contain the sustainer charge, to its desired operating pressure, in which case the port may have an associated valve to close the port and prevent loss of gas through the port in the reverse direction when the boost charge is burnt out. This arrangement is shown in FIGURE 1A where 18 is the valve.

Alternatively, the port may have a restricted diameter, for example 1/32 inch, so that the loss of gas through the port when the first charge is burnt out is unimportant.

The invention will be further understood from the following detailed description taken with the drawings in which:

FIGURE 1 is a fragmentary diagrammatic sectional view of a rocket motor;

FIGURE 1A is a fragmentary view of part of FIGURE 1, on an enlarged scale, showing a check valve associated with the port; and FIGURE 2 is a diagrammatic sectional veiw of a modified form of the rocket motor of FIGURE 1.

Referring to FIGURE 1 of the diagrammatic drawings the rocket motor illustrated therein comprises a cylindrical body or casing 1 which is divided into two parts by a septum or partition 2 having a port which is filled in as hereinafter indicated. The casing is covered with thermal insulation 13. A solid propellant boost charge 3 and a solid propellant sustainer charge 4 are disposed respectively at opposite sides of the septum 2.

Secured to the septum 2 in close proximity to the solid propellant sustainer charge 4 is a repeat igniter comprising ignition composition 5 carried in a cup 6 which is closed by a retainer disc 7. The cup 6 is held to the septum 2 by a nut 8 engaging with a spigot 9 held to the base of the cup 6. The spigot 9 passes through to fill the aforementioned port of the septum 2 and is bored to form a port 10 of restricted diameter.

A passage 11 (which is one of a number of such passages) extends lengthwise through the solid propellant boost charge 3 and opens to the septum 2 at one end and to the vicinity of a primary igniter 12 at the other end. The igniter 12 is associated with a primer (not shown) located in a transfer tube 15. In operation the primer (not shown) ignites the boost igniter 12 which then lights booster charge 3, the gases passing out through a nozzle located in the same relative position as shown in the phantom line in proposed FIGURE 2. A small amount of gas passes down channel 11 and through port 10 in the septum 2 and initiates the sustainer igniter 5. This in turn lights the sustainer charge 4, gas from which passes through the transfer tube 15 to a sustainer nozzle 17. During the period between boost burn-out and sustainer burn-out, a small quantity of gas is lost from the sustainer portion via the port 10 to the boost portion.

Referring to FIGURE 2 of the diagrammatic drawings the rocket motor illustrated therein comprises a cylindrical body or casing 1 which is divided into two parts by a septum 2 having a port which is filled in as hereinafter described. A solid propellant boost charge 3 and a solid propellant sustainer charge 4 are disposed respectively at opposite sides of the septum 2.

Secured to the septum 2 in close proximity to the solid propellant sustainer charge 4 is an igniter comprising ignition composition 5 carried in a cup 6 which is closed by a retainer disc 7. The cup 6 is held to the septum 2 by a block 8 engaging with a spigot 9 held to the base of the cup 6. The spigot 9 passes through to fill the aforementioned port of the septum 2 and is bored to form a port 10, one part of which is of restricted diameter. The larger section of this port 10 houses an auxiliary charge of ignition material 11, the port 10 then branches into an annular container 12 attached to the block 8, which container is filled with the main boost charge ignition material.

In use the flash from a conventional electric primer 14 which is held in place by a retaining nut 16 passes to the left through the transfer tube 15 to light the sustainer igniter 5 and the sustainer charge 4. Gas then leaves the motor via the tube 15, the remnants of the primer 14 being blown free. A small quantity of gas passes through the port 10 in the septum 2 first lighting the auxiliary ignition material 11, the booster igniter 12 and finally the booster propellent charge 3. The gas is subsequently lost into the empty boost portion after the booster charge has burnt out.

We claim:

1. A double chamber dual thrust rocket motor in which a propellant in each chamber is ignited substantially simultaneously comprising: a motor casing; a partition within said casing dividing the interior thereof into two chambers; a solid propellant charge in each of said chambers; a propulsion nozzle associated with each of said chamber; and means for igniting said solid propellant charges substantially simultaneously, said means including means defining a port through said partition for conducting heat energy through said partition and for restricting passage of gas therethrough to prevent any appreciable loss of pressure therethrough during burning of said propellant charges, an igniter associated with each of said propellant charges, at least one of said igniters being adjacent said port whereby ignition of the other of said igniters will ignite said one igniter by heat energy passing said port.

2. A rocket motor as claimed in claim 1 wherein the other of said igniters is disposed remote from said partition.

3. A rocket motor as claimed in claim 1 wherein the other of said igniters is in association with ignition means.

4. A rocket motor as claimed in claim 3 wherein the ignition means is an electrical igniter.

5. A rocket motor as claimed in claim 1 wherein the other of said igniters contains an electrical igniter.

6. A rocket motor as claimed in claim 1 wherein the igniter which is adjacent said septum comprises a charge captively arranged in a container to prevent dispersion of the charge before proper ignition thereof.

7. A rocket motor as claimed in claim 1 wherein the propellent charge associated with the other of said igniters has a passage extending through it.

8. A rocket motor as claimed in claim 1 wherein the port is of restricted diameter to prevent any appreciable loss of gas pressure therethrough.

9. A rocket motor as claimed in claim 8 wherein said diameter is $\frac{1}{32}$ inch.

10. A rocket motor as claimed in claim 1 wherein the port is sufficiently large to enable flow of gas from that side of the partition containing the propellant charge associated with the other of said igniters to assist in raising the pressure to the desired operating pressure on that side of the partition containing the propellant charge associated with said one igniter and wherein the port has an associated valve for closing the port and preventing loss of gas through the port from the last-mentioned side of the partition when the propellent charge associated with the other of said igniters is burnt out.

References Cited by the Examiner

UNITED STATES PATENTS

| 1,994,490 | 3/35 | Skinner | 102—49 |
| 2,724,237 | 11/55 | Hickman. | |
| 2,856,851 | 10/58 | Thomas | 102—49 |
| 2,939,393 | 6/60 | Johnson et al. | 102—70 |
| 3,008,414 | 11/61 | Jasse | 102—49 |

FOREIGN PATENTS

| 1,058,495 | 11/53 | France. |
| 1,123,880 | 6/56 | France. |

SAMUEL LEVINE, *Primary Examiner.*

JULIUS E. WEST, *Examiner.*